(12) United States Patent
Peirce et al.

(10) Patent No.: US 7,545,962 B2
(45) Date of Patent: Jun. 9, 2009

(54) BIOMETRIC AUTHENTICATION SYSTEM

(75) Inventors: Michael Peirce, Dublin (IE); James Ahern, Dunboyne (IE)

(73) Assignee: Daon Holdings Limited, George Town (KY)

( * ) Notice: Subject to any disclaimer, the term of this patent is extended or adjusted under 35 U.S.C. 154(b) by 719 days.

(21) Appl. No.: 11/316,398

(22) Filed: Dec. 22, 2005

(65) Prior Publication Data
US 2007/0150745 A1 Jun. 28, 2007

(51) Int. Cl.
*G06K 9/00* (2006.01)
*H04L 9/00* (2006.01)
(52) U.S. Cl. .................. 382/115; 382/124; 713/186
(58) Field of Classification Search .......... 382/115, 382/124, 119, 209, 218, 116–118, 120–123; 713/186; 283/68–70; 356/71; 902/3; 340/5.81, 340/5.82, 5.83
See application file for complete search history.

(56) References Cited

U.S. PATENT DOCUMENTS

| | | | |
|---|---|---|---|
| 6,526,396 B1 * | 2/2003 | Hiratsuka et al. | 706/52 |
| 6,591,224 B1 * | 7/2003 | Sullivan et al. | 702/179 |
| 2002/0035542 A1 | 3/2002 | Tumey et al. | |
| 2003/0051147 A1 * | 3/2003 | Maeda et al. | 713/186 |
| 2004/0125993 A1 | 7/2004 | Zhao et al. | |
| 2004/0199776 A1 | 10/2004 | Kittler et al. | |
| 2004/0250085 A1 * | 12/2004 | Tattan et al. | 713/186 |
| 2006/0093208 A1 | 5/2006 | Li et al. | |
| 2006/0293891 A1 | 12/2006 | Pathuel | |

FOREIGN PATENT DOCUMENTS

| | | |
|---|---|---|
| EP | 1 160 721 A2 | 12/2001 |
| EP | 1 160 721 A3 | 12/2001 |
| EP | 1 187 057 A2 | 3/2002 |
| EP | 1 187 057 A3 | 3/2002 |
| WO | WO/03009111 A2 | 1/2003 |

OTHER PUBLICATIONS

PCT International Search Report; PCT/EP2005/057113; Mar. 10, 2006 and related documents.
Jain, et al. "Learning User-Specific Parameters in a Multibiometric System"; IEEE; 2002; pp. 57-60; vol. 2; New York, US.
Wayman; "Multifinger Penetration Rate and ROC Variability for Automatic Fingerprint Identification Systems"; Ratha & Bolle Eds.; 2004; pp. 305-315.

* cited by examiner

*Primary Examiner*—Daniel G Mariam
(74) *Attorney, Agent, or Firm*—Kevin McDermott, Esq.

(57) ABSTRACT

A biometric authentication system configured to enable an authentication process has predefined parameters associated therewith and provides for authentication of a user based on a comparison of a presented biometric with at least one previously stored biometric. The authentication system includes a matching system providing as an output an output score based on the comparison of the presented biometric and the at least one previously stored biometric. Moreover the authentication system is configured to authenticate the user on determining that a parameter based on the output score, meets a threshold score, and includes an audit module configured to monitor the authentication process and to provide at least one revised threshold score. The at least one revised threshold score is provided based on an analysis of the performance of the authentication system over a predefined time period using current threshold scores.

34 Claims, 5 Drawing Sheets

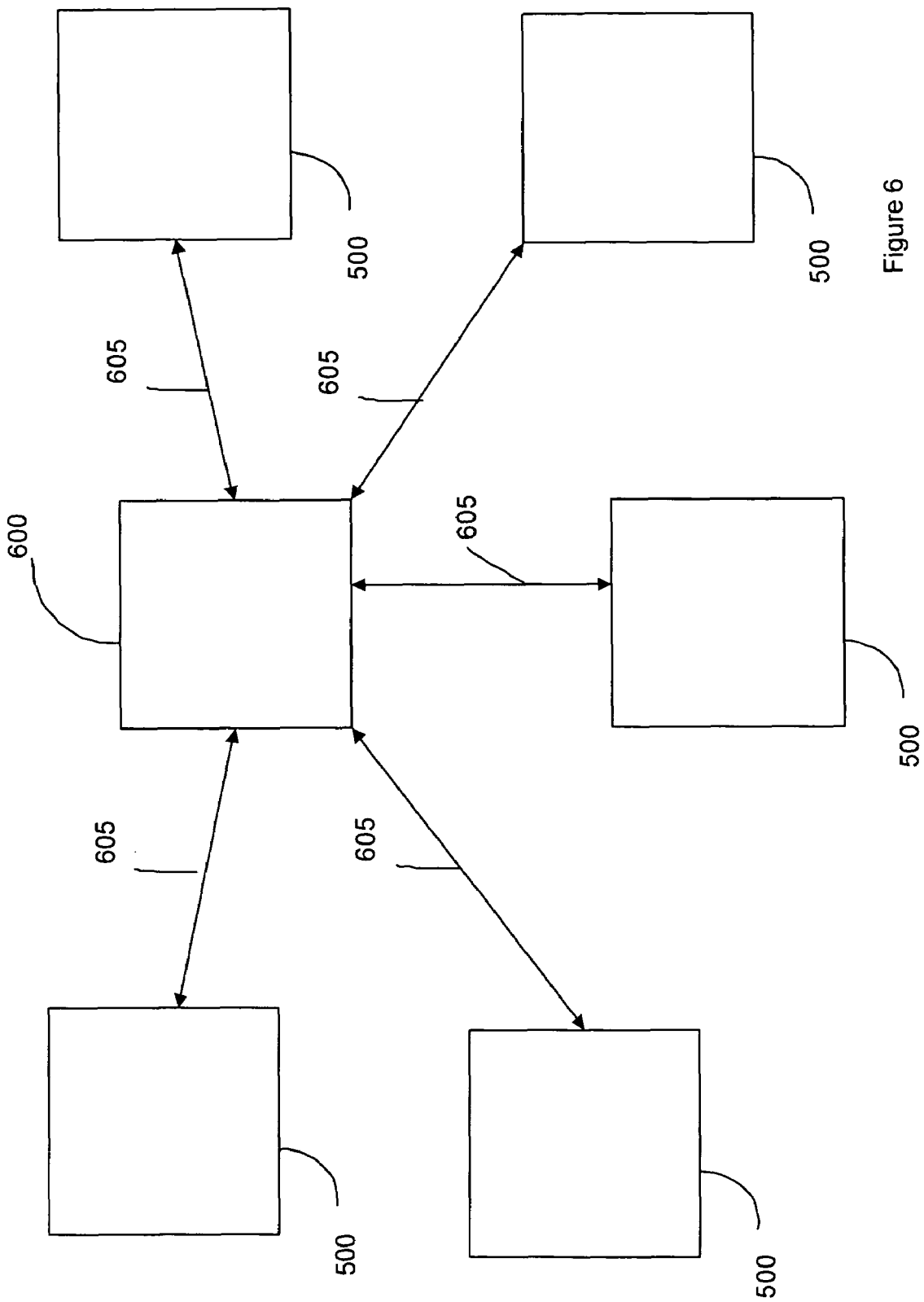

BIOMETRIC AUTHENTICATION SYSTEM

BACKGROUND OF THE INVENTION

1. Field of the Invention

The present invention relates to biometric authentication systems and in particular to biometric authentication systems that are configured to dynamically update the matching thresholds used during the authentication process based on user activity within the system. The invention also relates to biometric authentication systems which are configured to dynamically apply different matching thresholds depending on the circumstances of the authentication process.

2. Description of the Related Art

Systems for authenticating the identity of an individual are now becoming widely deployed. Such systems may be used for a plurality of different reasons, for example, to enhance security at a border crossing, to identify individuals in a citizen ID scheme, to allow physical access to a building, to provide logical access to networks and computer applications, to prove identity during retail transactions, amongst many other possible applications.

Known techniques used within such authentication systems for validating the identity of an individual include the use of passwords, tokens, biometrics, or any combination of these. Within a biometric-based system, biometric samples are initially captured from an individual and enrolled, or stored, within the system for use in later authentications. Examples include fingerprint, iris, or face images, or a recorded sample of a voice.

Features may be extracted from the image to generate biometric templates. These are usually a smaller compact representation of the biometric features present in the image. Typically, the templates are used in the day-to-day operations of the system to authenticate individuals whereas the original biometric data or image is stored or archived.

At a later date or time a user supplied biometric sample is then tested against the stored template and if a match, within a desired confidence level, is obtained then the user is authenticated. An authentication may be performed using one or more biometric samples from one or more biometric modes. For each individual sample, the verification sample is typically compared against one or more enrollment samples or templates derived from those samples. This comparison is performed by one or more matching algorithms, which typically output a matching score indicating the similarity between the two compared samples. Ideally, this score will be well-distributed across all possible samples in the space.

As such, a biometric authentication system may be considered as constructed of a plurality of different components; a sensor to record the presented biometric, a computer unit to process and eventually save the presented biometric and an application, for which the user's authentication is necessary. The computer unit which processes the presented biometric for authentication or otherwise, includes a processing unit that includes a "feature extraction unit" which filters the uniqueness data out of the raw data coming from the sensor and combines them into the request template, a "matcher" which compares the request template with the reference template and delivers a "score" value as a result, and a "decision unit" which takes the score value (or values) as well as the threshold to determine whether the user is authorized or non-authorized.

The matcher incorporates a matching algorithm which will deliver some level of biometric accuracy depending on the acquisition devices, acquisition methods, quality scoring algorithms, environment, and population present, amongst other factors. The "decision unit" compares the score derivable from the matcher with a pre-established threshold and if the score meets an established confidence level then the user is authenticated and if it fails they are rejected.

In order to define an appropriate threshold value for a specific authentication engine one considers a number of measures which determine the effectiveness of a biometric authentication system and examples of these are detailed below.

A False Acceptance Rate (FAR) is a measure of the frequency that a non authorized person is accepted as authorized, given a number attempts to perform that authorization. Such authorization of a non authorized person is an obvious security breach and as a result a FAR is generally considered a security relevant measure. A FAR may be considered a systematic indicator.

A False Rejection Rate (FRR) is similar to the FAR but is the frequency that an authorized person is rejected access. In a verification system, such authorization failure of an authorized person is considered as an inconvenience to that person. This does not constitute a security breach in the same way as a FAR.

A False Match Rate (FMR) is the rate which non-authorized people are falsely recognized during the matching comparison process. Therefore the FMR may be considered an indicator of the effectiveness of the matching algorithm as opposed to the system error.

A False Non-Match Rate (FNMR) is the rate that authorized people are falsely not recognized during feature comparison. Similarly to the FMR, and in contrast to the FRR, attempts previously rejected are not accounted for, and it can therefore be considered an algorithm indicator.

The above definitions are described in the context of a verification or positive identification system where the purpose is to confirm that the authorized person is enrolled in the system. In a negative identification system the purpose is to confirm that a person does not appear in the enrolled system; sample applications include use of criminal watch-lists or ensuring that a new applicant to a system (e.g. voting) is not already registered in that system. In the case of negative identification the FRR or FNMR does constitute a security breach because if the person is incorrectly rejected then that person has avoided detection even though they are already enrolled. Similarly, for negative identification the FAR or FMR constitutes an inconvenience for the genuine person because they have been incorrectly matched against another person already enrolled in the system.

The effectiveness of the authentication system can be measured using either a combination of the FAR with FRR or FMR with FNMR and it is important to ensure that their ratios are kept to an appropriate level. It is important for an effective system that too many who should be allowed access are not allowed access whereas too many who should not be allowed access are allowed access. There is a trade off in these measurements and this tradeoff defines the threshold for the system.

To determine this ratio, it is known by the suppliers of biometric processing algorithms to generate receiver operating characteristic curves (ROCs). In order to create an ROC curve, a biometric system test usually starts by determining the similarities of different biometric features and a saved reference feature. After many measurements, one receives a histogram or distribution for authorized users and another for unauthorized users showing the frequency of matches per similarity rating. In an ideal case, the two distribution graphs should overlap as little as possible. Through integration of these distribution graphs, FAR/FMR and/or FRR/FNMR graphs are determined, which are dependent on the data from which they were generated. If one wants to compare different biometric systems, it is problematic in that algorithmic value "similarities" or, inversely, "distances" are defined very differently, and therefore threshold values often have incomparable meanings. This difficulty is avoided by a ROC, in which the similarity threshold parameter is eliminated and FRR or FNMR is seen as a function of FAR or FMR respectively. By plotting either the FRR as a function of the FAR or the FNMR as a function of the FMR it is possible to visualize the performance of the system and to choose from the values generated a threshold value which will give an appropriate level of confidence in the security achievable with the system. Many suppliers of biometric algorithms provide to the vendors of the authentication systems one such threshold value from the generated ROC curve for their specific algorithm and this can be considered a fixed static score threshold value. It will be appreciated that a ROC is just a graphical representation of a threshold table.

Existing deployments typically just select this one supplied fixed static score threshold, and use this as the matching decision threshold. For example, scores at or above the threshold are accepted as successful matches, and scores below are rejected, or vice-versa. The problem with such a static threshold is that no account is taken of the specifics of the enrolment process, the specifics of the authentication process or other parameters.

It will be further understood that the definition or construction of a ROC is dependent on the usage pattern of the parameters that define that specific ROC. As the ROC is a statistical representation of the results obtained using a specific set of data parameters it will be understood that the greater the statistical population that is used to define the ROC, the better the representation the ROC will be of the overall efficiency of the system. Furthermore it is possible that continued use of authentication systems using a specific ROC may provide an indication that the parameters making up that ROC are not optimized and require tuning or some other form of modification. However, heretofore once a biometric authentication system has been deployed it stands alone and the threshold values that are used to authenticate the user are based on the parameters that were available at the time of deployment of the system. These parameters can, over time, become superseded or redundant but this is not reflected in the authentication process. As a result the security levels and/or convenience levels that are achievable with an out of date authentication system are less than is possible with an up-to-date system.

There is therefore a need to provide an improved authentication system and process which can take these variances into account when performing the authentication. There is another need to provide an improved authentication system that can provide a dynamic update of the threshold parameters that are used for the authentication process based on usage data of the system.

SUMMARY OF THE INVENTION

These and other problems are addressed in a first embodiment of the present invention by a biometric authentication system and process which utilizes a dynamic update of the threshold parameters used for effecting the matching process used during authentication. In accordance with this embodiment of the invention, the biometric authentication system includes an update feature that is configured to periodically update the threshold parameters used for the authentication of a user based on usage patterns of the authentication system over an extended time period. This update may either be resultant from the usage of the specific installation of the biometric authentication system or may result from data collected from a plurality of authentication systems.

Accordingly the invention provides a biometric authentication engine or system configured to enable an authentication process having predefined parameters associated therewith and providing for authentication of a user based on a comparison of a presented biometric with one or more previously stored biometric(s). The authentication system includes a matching system providing as an output an output score based on a comparison of the presented and stored biometrics and is configured to authenticate the user on determining that a parameter based on the output score meets a threshold score. The system includes an audit module configured to monitor the authentication process and to provide one or more revised threshold scores which are based on an analysis of the performance of the authentication system over a predefined time period using current threshold scores.

The invention also provides a method of authenticating a user in a biometric authentication environment that includes receiving a request for authentication, the request for authentication including a presented biometric, analyzing specifics of the request so as to extract one or more parameters specific to the request, matching the presented biometric with a previously stored biometric for that user so as to provide a matching score, comparing a stored threshold score with the matching score, authenticating the user on determining that the matching score exceeds the threshold score, and monitoring the performance of the authentication process over time and updating the stored threshold score with a revised threshold score on determining that the performance of the authentication process using the stored threshold score falls below a desired performance criteria.

In accordance with another embodiment of the invention, a network architecture is provided in which at least one of a plurality of authentication systems is configured to enable an authentication process having predefined parameters associated therewith and that provides for authentication of a user based on a comparison of a presented biometric with one or more previously stored biometric(s). The authentication system includes a matching system providing as an output an output score based on a comparison of the presented and stored biometrics and is configured to authenticate the user on determining that a parameter based on the output score, meets a threshold score. The system includes an audit module configured to monitor the authentication process and to provide one or more revised threshold scores which are based on an analysis of the performance of the authentication system over a predefined time period using current threshold scores. The network includes at least one audit module configured to receive data relating to the authentication process from at least one of the authentication systems within the network and to process the received data so as to provide an analysis of the performance of the system using current threshold scores. The audit module is further configured to generate one or more revised threshold score to supplement the current threshold scores used at one or more of the authentication systems within the network.

A further embodiment provides a biometric authentication system and process which utilizes a dynamic threshold for effecting the matching process. In accordance with a first embodiment of the invention, the biometric authentication system includes a plurality of different score threshold tables and provides for a selection of an appropriate score threshold table for any one authentication process depending on the specifics of that authentication process. Within that one selected threshold table, one can then further select one or more threshold scores as appropriate to the authentication regime being effected.

These and other features of the present invention will be better understood with reference to the following drawings.

BRIEF DESCRIPTION OF THE DRAWINGS

FIG. 6 is as schematic of a distributed network architecture incorporating a plurality of biometric authentication engines.

DETAILED DESCRIPTION OF THE INVENTION

Known biometric authentication engines may use static fixed thresholds and policies as part of their authentication process. It should be appreciated that there are are a plurality of different factors which may affect the performance and accuracy of such authentication systems. Such factors include, but are not limited to, the specifics of the biometric enrollment acquisition device, the algorithm and environment, the biometric authentication acquisition device, the deployed population, quality scoring algorithms, filters, matching algorithms, populations, environments, authorization protocols, configurations, and time. All these factors can contribute to the overall accuracy achievable with the authentication system. This becomes particularly important in a distributed biometric authentication system where a user may be enrolled using one set of parameters and then tested at a later date using a completely different set of parameters.

The present inventors have realized, in the light of the contribution that each of these individual factors make to the overall accuracy, that each time any one of these factors changes, the threshold required to achieve a similar confidence interval (e.g. FAR=1E-5) needs to be altered. Using this knowledge the present invention provides for an authentication process that can be applied in an authentication engine with biometric authentication capabilities (1:1, 1:few, 1:N) for multiple biometric modes, algorithms (matching, quality, filtering), and readers.

Understanding that a plurality of different parameters can affect the confidence levels achievable with an authentication of a user, an authentication system is provided that utilizes different confidence threshold tables depending on the specific circumstances of the authentication process being conducted. Furthermore, it is understood that a single performance number cannot adequately represent the capabilities of a biometric matching algorithm that can operate at selectable thresholds. A threshold table which equates to a non-graphical ROC curve, is used to show how the accuracy varies over a range of operating points. Current best practices in biometrics performance testing also recommend the use of ROC curves in evaluation of different biometric systems, but not in the authentication process itself.

Figure 1:
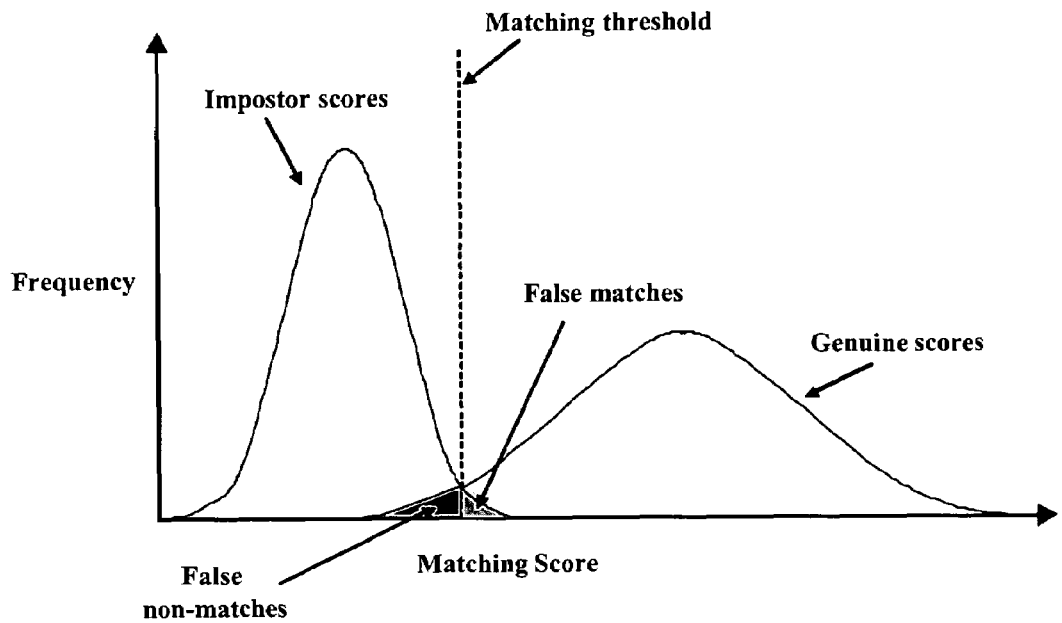
FIG. 1 is a score distribution curve providing a visualization of how actual score threshold changes affect False Match Rates and False Non-Match Rates error-rates.

As mentioned above, a ROC curve for FMR/FNMR plots the probability of a false-match against that of a false non-match for a single match attempt. It shows the tradeoffs available for a given matching algorithm on images captured from a specified device, in a given environment and population. Where a verification protocol allows multiple attempts per session the ROC shows the probability of a false-accept (FA) against that of a false reject (FR) for the number of attempts allowed by the authentication protocol. The score distribution curve shows the frequency of matching algorithm scores returned for all genuine and impostor attempts. Each score will correspond to a point on the corresponding ROC curve. The score distribution curve gives a good visualization of how actual score threshold changes affect the FMR and FNMR error-rates, as illustrated in FIG. 1.

Figure 2:
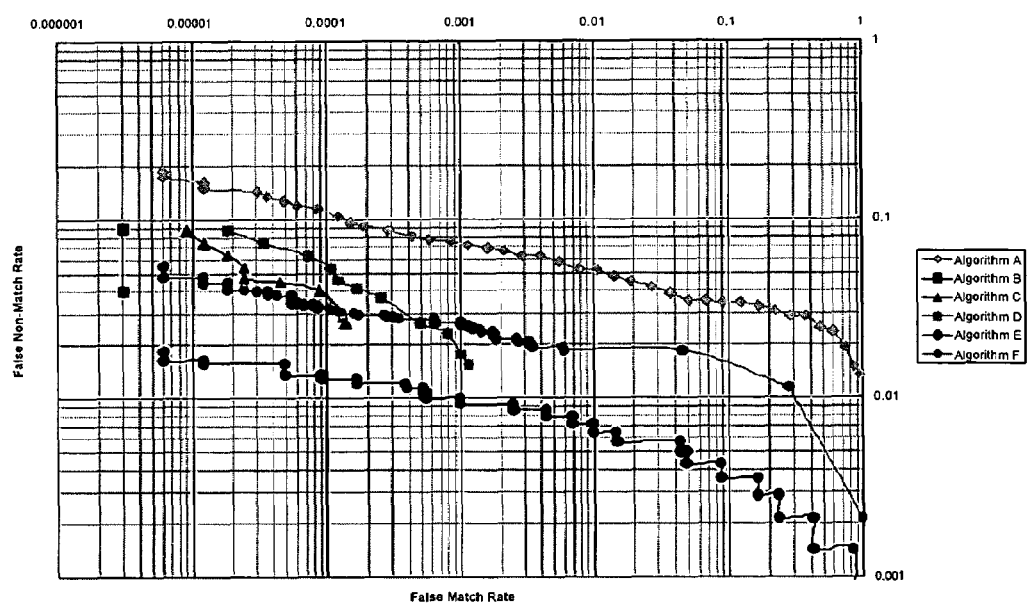
FIG. 2 is an example of a Receiver Operator Characteristic curve as calculated for five different algorithms.

The present invention provides within the biometric authentication engine a number of distinct ROC curves (or the threshold tables that are used to generate these curves); with each ROC curve being specific to a set of parameters that are used to generate that ROC curve. The effect of variances on the threshold accuracy is shown in FIG. 2. This ROC shows different algorithm accuracies obtained with a single sensor, using the same population. The algorithm-sensor combination, labeled as Algorithm C, gave an FNMR of 1.3% when the FMR was 0.01%, and a FNMR of 1.6% when the FMR was 0.001%. This graph could be used to select one algorithm's accuracy over another for use with a specific sensor, or indeed to select the appropriate algorithm for that sensor.

Within the system, a different ROC threshold table may be used for each possible factor change. The system supports multiple different ROCs depending on the enrollment/verification device combination, the population and the environment etc. Such differences may include "cross-device" ROCs, where an enrollment sample was captured from device-A and the verification sample was captured from device-B. For example, in order to operate at a confidence level with an FAR of 1 in 100,000 (FAR=1E-5) one might need to obtain a score of 68 or above using algorithm A and device-A for both enrollment and verification. However, using the same algorithm-A but device-B for both enrollment and verification requires a score of 80 to produce the same FAR confidence level. It will be appreciated that if the prior art methodology of using the same single static threshold is used for both cases, the actual error rates achieved are unknown. Those using device-A will be required to achieve higher scores than necessary, and this will result in a higher false non-match rate (FNMR) and degrade overall biometric performance. Alternatively, those using device-B will only have to achieve the lower score threshold, which will mean that the actual FAR will be lower than the requested confidence interval, resulting in more false accepts which is very undesirable.

Further ROC curves may be provided with their data specific to the demographics (e.g. gender or age) of the population. Further ROC curves may be provided for the type of biometric sample that is used for authentication. Yet more ROC, curves may be provided for the type of capture apparatus that may be used as part of the authentication process, and/or the positioning and usage protocol for that apparatus.

Figure 3:
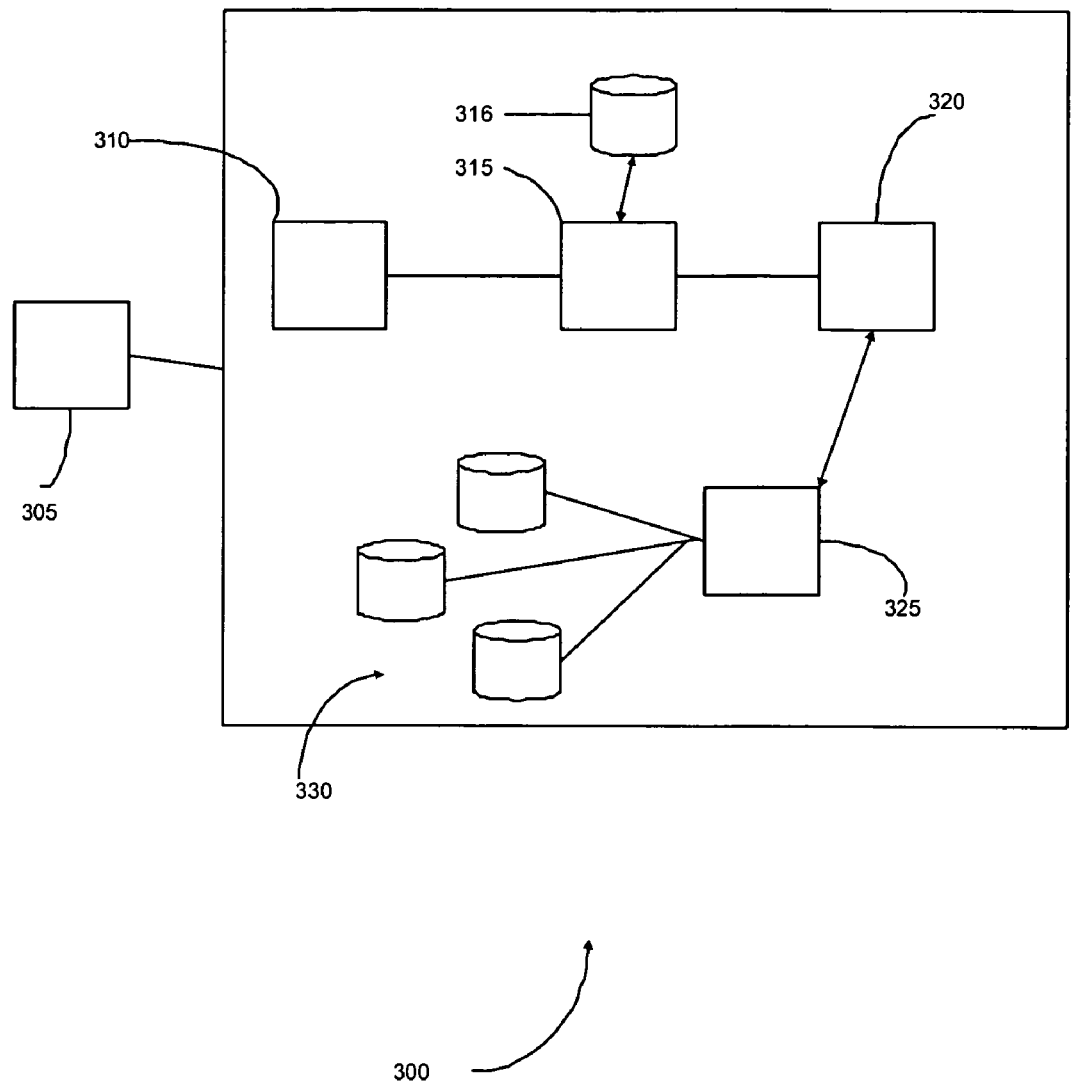
FIG. 3 is a schematic of components of a biometric authentication system in accordance with the present invention.
Figure 4:
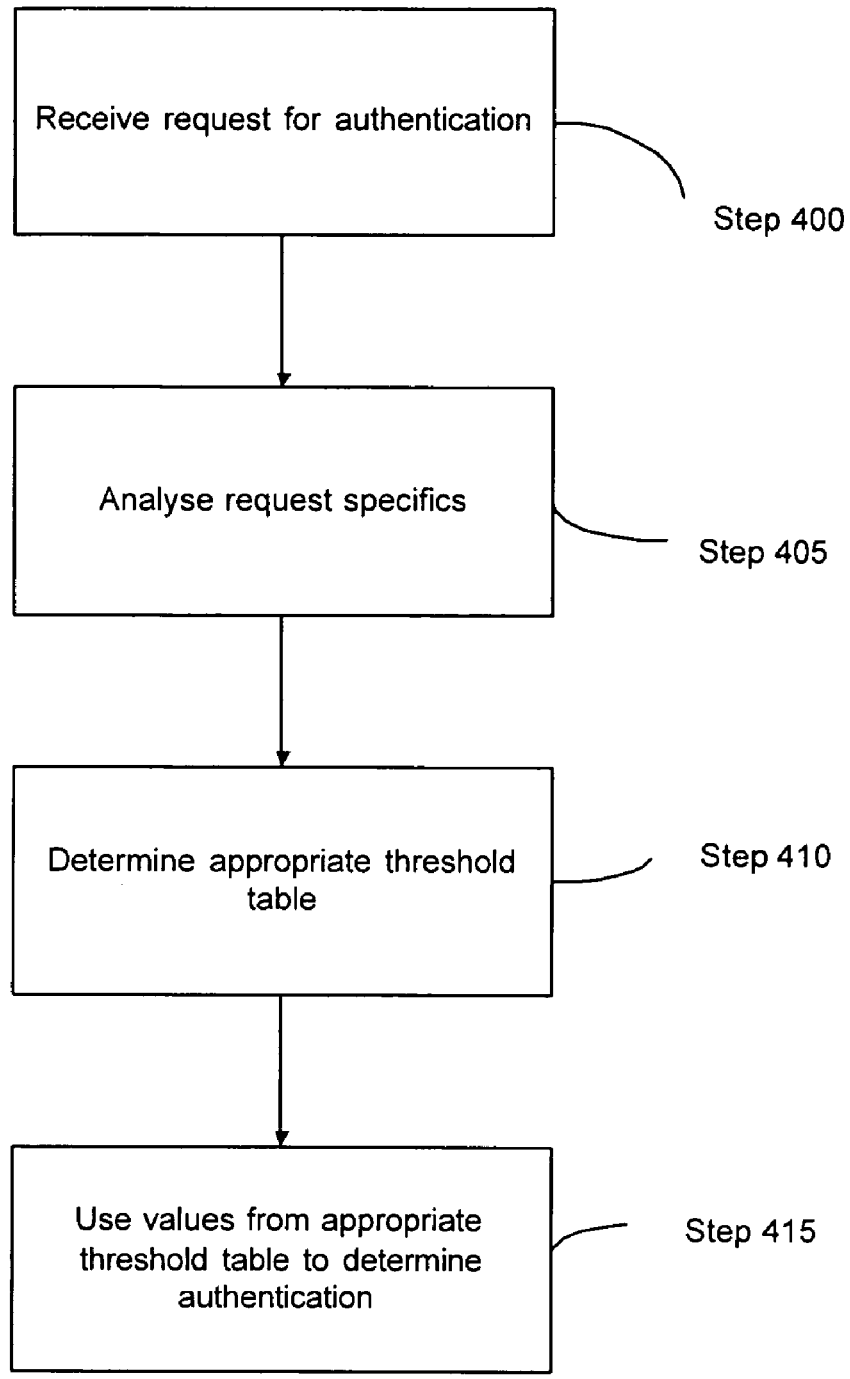
FIG. 4 is a process flow showing exemplary steps involved in an authentication request in accordance with the teachings of the invention.

FIG. 3 shows a typical architecture for a biometric authentication system 300 according to the invention, and the operation of same will be described with reference to the process flow of FIG. 4. Similarly to the prior art, the authentication system may be considered to include a capture device 305 which is a piece of hardware configured to capture a specific type of biometric sample. Examples of such capture devices include retina scanners, fingerprint scanners and the like, all of which will be well known to the person skilled in the art. The user requesting authentication (step 400) has their biometric sample captured. It is then processed by a processing unit 310 that includes a feature extraction unit which filters the uniqueness data out of the raw data coming from the sensor and combines them into the request template. This request template is then transferred to a matcher 315 which compares the request template with a previously stored reference template and delivers an output score value as result. The previously stored template is identified and retrieved from a datastore 316 in one of a plurality of different manners as will be apparent to the person skilled in the art. This output score is then transferred to a decision unit 320 which takes the score value (or values) calculated as well as a threshold score to determine whether the user is authorized or non-authorized. The present invention also includes a threshold evaluator 325, which is configured to analyse the specifics of the authentication request, for example to determine the type of hardware used for both the recordal of the reference template and the sample template, the algorithms used in the filter extraction and/or matching processes etc., (Step 405) and determine which of a plurality of available threshold tables 330 should be used to provide the threshold score for this decision (Step 410).

Once the appropriate threshold table has been identified and as part of the authentication process that is conducted, each generated matching score that results from a comparison of the presented biometric with the stored biometric is then mapped with a point on the corresponding ROC that is specific to the circumstances of this matching process. This mapping is automatically selected by the system based on an interrogation of the background to the matching and once the appropriate ROC table has been identified and selected, the error rates are computed from that table. It will be appreciated that a match involving multiple samples or biometric modes may result in several different scores, with a different ROC applied to each score. The scores or the corresponding confidence levels can be fused or computed to produce an overall result. The result obtained is then compared with the requested confidence level to ascertain whether the user should be authenticated or not (Step 415). It will be understood that depending on the nature of the match being effected that authentication may be effected on the output score being greater than, equal to or less than the threshold score. For example with an FMR threshold, the smaller the number the better (e.g. an FMR of 0.00001 is a BETTER score than 0.01), and in this case the output score must be less than (a smaller number) the threshold score. As will be appreciated by those skilled in the art the use of FMR thresholds is typical in authentication systems.

It will be appreciated that the components of the authentication system 300 could be provided on one or more computing systems or even distributed across a networked architecture. Examples of such distributed architectures include those described in our earlier application WO03009111. The process may also take place entirely, or in part, on tokens such as smart cards. Furthermore the invention is not to be limited to order of the sequence of steps shown in FIG. 4. The benefit from the system of the present invention arises from the fact that the authentication process is tailored to the specifics of the authentication request.

Such a system becomes even more relevant when deploying the recent biometric template interoperability standards such as those for minutiae templates. These are planned for use in passports globally as part of increases in passport security. The minutiae template standard defines an open format for storing and matching fingerprint minutiae points, created by different algorithms. For example, an enrollment template might be created by algorithm-A on device-A, while the verification template might be created by algorithm-B on device-B, and both templates matched by algorithm-C. The interoperability allows this interchange of templates between different vendors. However, as explained above, the biometric accuracy will always differ depending on the devices, algorithms, and other factors present. By using a system in accordance with the teachings of the invention it is possible to specifically allow for these differences by using a different ROC table for each possible factor combination. The enrollment attributes (device, quality algorithm, template generation algorithm) are associated with the enrollment template. These along with the verification template attributes, and the environment/population factors are used to select the most appropriate ROC table to compute the confidence levels achieved from the matching scores. This will yield superior and more accurate results, and avoid the problems associated with static thresholds. The system may be used with any other template and image standards, other than the minutiae-template example used here.

The exemplary embodiment has referred to the use of ROC curves. However, there are other accuracy statistics and corresponding graphs that can be used to measure the biometric performance in different scenarios. For example, a Cumulative Match Characteristic (CMC) curve may be used to show the probability of identification (1:N) against the returned candidate list size. It shows the probability that a given person appears in different sized candidate lists. The faster the CMC curve approaches one (on the y-axis), indicating that the person always appears in the candidate list of specified size, the better the matching algorithm for the particular scenario under consideration. In the same way that different ROC threshold tables were utilized in the authentication decision process, one or more CMC threshold tables may also be used in an identification decision process. For example, the number of potential candidate matches returned may be dynamically decided based on information in a CMC table, where that table was selected to best match the parameters of the authentication request.

It will be appreciated that what has been described herein is an improved biometric authentication system which provides for a tailoring of the authentication process to the specifics of the authentication request. Such a tailoring of the specifics based on a plurality of tables, each table being generated as a result of the performance of specific parameters relative to a measured authentication process is greatly beneficial vis a vis the prior art techniques.

Figure 5:
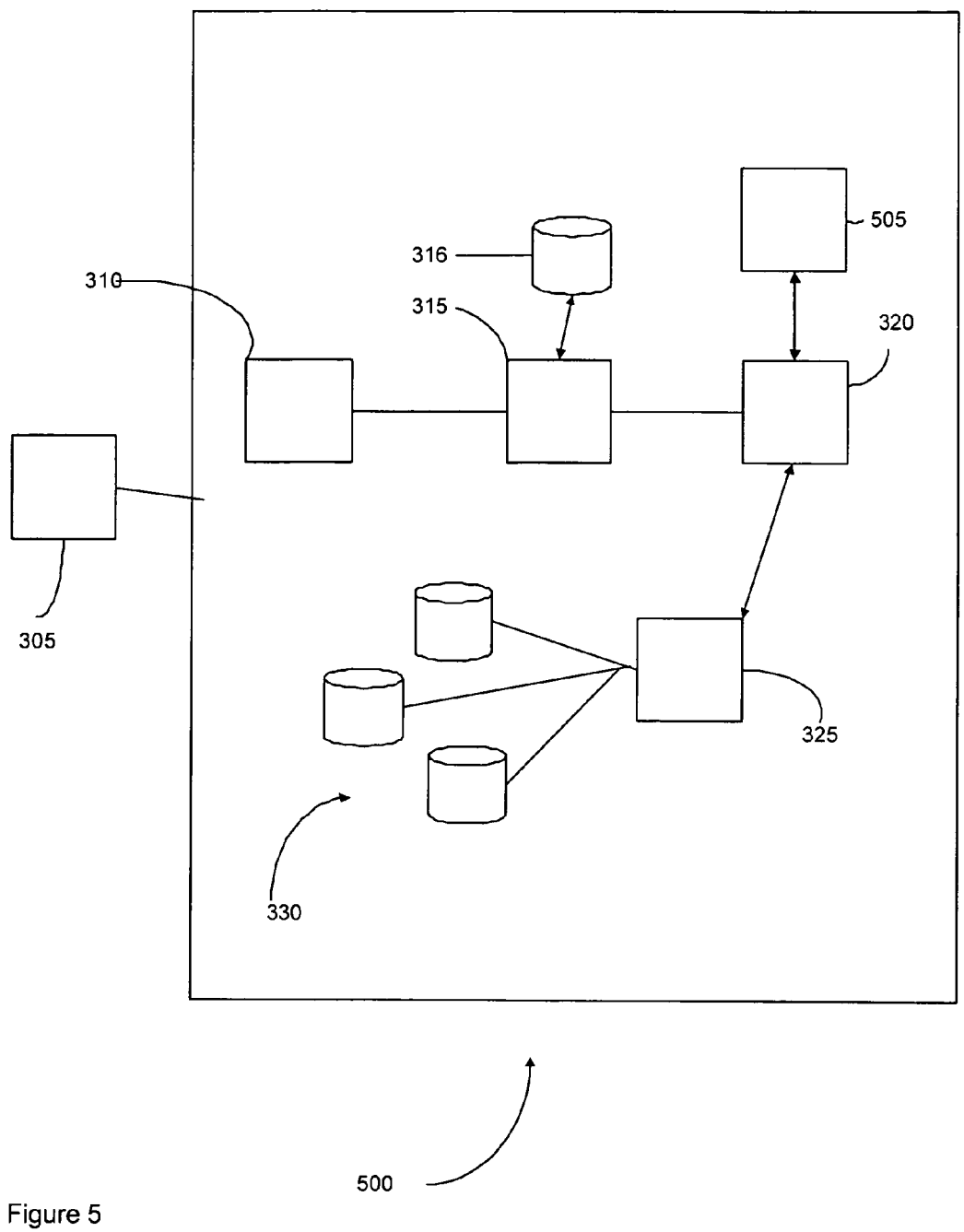
FIG. 5 is a schematic of a biometric authentication system in accordance with a second embodiment of the invention.

In a second, preferred, embodiment of the invention, an example of which is shown in FIG. 5 (where the same reference numerals are used for common components from the architecture described before), a system 500 and method is provided which provides for a dynamic tuning of one or more of these tables based on an on-going monitoring of parameter performance. It will be appreciated that as the tables are the result of statistical analysis of the performance of systems using the specific parameters that an increase in the pool of data that is analysed to provide the statistical output will provide an improved reflection of the actual performance. In this embodiment of the invention an authentication system is provided which is configured to collect biometric data during transactions and based on a subsequent analysis of this data, to update the parameters that are used in the authentication process. In this manner the second embodiment of the invention provides a self-tuning self-managing biometric engine.

By enabling this update of the threshold parameters that are used to authenticate a user such a self-tuning system can cater for the variances that are known to effect biometric systems as a result of variances such as time variances. Furthermore when used in the context of the plurality of threshold tables, with each threshold table being suited to a specific set of user inputs or parameters associated with a specific authentication request, such a self tuning application may be used both to update the tables already present in the authentication engine or to introduce new tables if and when these become available. Such monitoring and tuning of the performance of a specific authentication engine may be provided on a periodic or continuous time frame.

It is also not possible using the existing architectures to change the thresholds that are set to enable authentication over time. An example of where this could be useful is where a first set of low thresholds are initially used in a deployment where users may not be familiar with the system or methodology. As their familiarity increases it becomes appropriate to increase the threshold parameters—which can be achieved with a system where dynamic tuning can be implemented.

In order to implement such a dynamic update of the authentication system the present invention provides for the maintenance of an audit or log of the biometric data that is processed during its daily operation. Such a log function is provided by providing an audit module 505 which is configured to interact and monitor the processing of data by the decision unit 320. This biometric data includes, but is not limited to, multi-frame captures, single images, templates, quality scores, matching scores, filtering results etc. Additional audit data might include, but not be limited to, authentication location, timings around the transaction, user identity, operator identity, reader/sensor identity, time-of-day etc. The captured data (biometric and other data types) can be analysed in real-time, or otherwise, and the results of this analysis used to tune the performance of the authentication engine or indeed of other connected authentication engines.

An example of such a distributed network of authentication engines is shown in FIG. 6 with again the same reference numerals being used for previously described components. In this architecture a plurality of individual engines 500 are provided each of which is self sufficient in being able to authenticate a user presenting at a biometric capture device coupled to that engine. However, by enabling one or all of the engines to log the data that is processed at that engine, the overall statistical pool is increased beyond that possible at one unique site. Each of the audit modules 505 can be configured to either dynamically update the data used from data collected locally or can be configured to present their collected data to a remote data processing engine 600 which takes multiple feeds 605 to define new data sets than can then be pushed out to the individual data stores 330.

It will be appreciated by those skilled in the art that the type of analysis that can be performed and the many ways that the results of this analysis can be used to update the configuration of or modify the behaviour of the authentication engine may be varied. For example as shown in FIG. 6, the logged data may be collected centrally by a processing engine 600, from data sent to it by clients and/or other engines 500 or indeed can be processed remotely at each of the clients 500. Furthermore in a distributed network of authentication engines, such as that described in our earlier application WO03009111, certain engines may be selected as audit engines configured to maintain a monitoring of the authentications performed at that engine and once data has been collated and an update data set compiled that that data set may then be pushed to co-operating yet remote engines where it is used to update the data sets that are used locally at those engines. The amount of data logged is configurable, and can be limited to specific services, groups, users, or random selections taking for example privacy issues into account.

It will be further appreciated that if the data audit or log is to be used across different platforms or system architectures that it is advantageous that the data be stored in a platform independent fashion such as for example XML format. Alternatively the processing function may include one or more software utilities that are configured to translate or transform the data from proprietary formats to a format that can be immediately processed by the analysis application responsible for dynamically tuning performance.

The following non limiting examples are provided as exemplary illustrations of the type of analysis operations that may be performed once the data has been logged.

It will be understood that performing an update on the system parameters that are used to authenticate a user may not be desirable during a certain time period or within certain time intervals. In accordance with the system of the invention, policies may be implemented that will restrict and control for example how much tuning takes place, which analysis applications can perform the tuning, who is given access to the data for tuning, and which biometric components or other may be tuned. Furthermore, security procedures may be provided to ensure that an attacker who controls the biometric data fed into the engine does not adversely affect the performance thresholds to his advantage.

For example, the can be done by monitoring the deviation from typical data or the deviation of data over time. Alarms can be triggered if a certain level of deviation is exceeded and this may be location specific.

As mentioned above, the data that is logged or saved may be present at different parts in a distributed network and the analysis application can collect it from one or more of these points. For example, this might be provided as a service to several deployments or sites. A single analysis component may use data from several distributed locations (e.g. geographically separated deployments) to selectively tune one or more specific authentication engines or subset of engines, rather than all engines within the distributed network. Both dependent and independent distributed analysis components can co-operate to share their findings and recommendations.

One of the advantages of a self tuning analysis engine is derived from the fact that the system can react to variances in the system which develop over time. For example, the analysis can also create reports of users who may need to re-enroll some or all of their biometrics, users who have difficulty with certain biometrics, users who can be more easily impersonated (lambs), users who can more easily impersonate others (wolves) and so on. For example, user-specific thresholds might be recommended for some of these categories of users or use of alternative biometrics or other technologies: identification of an underperforming location or reader; recommendation to replace/clean readers or change environment; detection of a change in ambient lighting which adversely affects iris or face recognition; recommendation of best biometrics to use for specific users, specific groups of users, specific locations and the like; and recommendation of new biometric algorithms (matching, quality, filtering) to use which would improve performance over current deployed selections.

For example, a receiver operating characteristic (ROC) curve, which shows the FMR/FNMR tradeoffs at all possible thresholds for a specific biometric reader-algorithm combination in a given environment with a given population, can be generated. The authentication engine can use an ROC to dynamically select the matching threshold value that must be achieved to reach a specific FMR or FNMR confidence level. A further example of the application of the self tuning engine is that if the curve differs from the curve currently being used in the authentication engine, or if segments of the curve differ, or if the thresholds have moved, then the new ROC can be used to replace the old one. This updating of the data sets used to authenticate a user, as required, can be used to provide improved accuracy, as the new ROC represents real biometric behaviour, rather than older predicted behaviour. Alternatively, the existing ROC can be updated by combining it with the new ROC using some weighting or other method.

Furthermore, as users become more habituated with a system, the probability of a false reject (FNMR) may fall, thus allowing a stricter false accept rate (FMR) to be set for the same percentage false reject. It will be appreciated that similar examples can be provided for Cumulative Match Characteristic (CMC) curves and FAR tables.

When determining the quality threshold required for a specific enrolment application it will be appreciated that the quality threshold may vary depending on the specifics of the application. Different examples include the quality scores used for image acquisition. For example, by examining the score distribution for the quality scores achieved during image acquisition, better image acquisition thresholds or capture algorithms can be derived and fed back into the engine and its capture clients Furthermore, the relationship between quality score and match result can be examined, and this used to further tune the acquisition algorithm. For example, the acquisition algorithm might drop the quality threshold that must be met during acquisition over time, and the rate and levels of this drop will have been obtained from ongoing analysis of this data.

It is known that users' biometric data can change over time—e.g. aging of the face, scarring and drying of fingers. As a result of these changes it may be necessary to update the enrollment data over time to allow for these changes. However people change at different rates and some change more radically than others. Using a dynamic system in accordance with the present invention it is possible to provide an analysis process that can dynamically monitor performance on an individual basis, noting when performance degrades below the "normal" level for specific users. It can then recommend from the history of biometric data collected for that individual, how best to update the existing enrollment data—this might range from a complete re-enrollment to partial updating and/or merging of the data.

It will be appreciated that heretofore that the improvement obtainable using a dynamic engine as provided by the present invention has been described with reference to core biometric performance. A dynamic engine according to the teachings of the invention can also measure response times and throughput. For example, such response times and throughput include, but are not limited to, average response times, image acquisition times, transaction times, matching times, and peak number of requests. These response times and throughput can all be monitored and the authentication thresholds altered dependent on the normal characteristics associated therewith.

While the invention has been described with reference to exemplary embodiments it will be appreciated and understood, that the invention is not intended to be limited in any way except as may be deemed necessary in the light of the appended claims. Modifications can be made without departing from the scope and spirit of the invention. Furthermore whereas the invention has been described with reference to two exemplary embodiments; the provision of an authentication engine that makes use of multiple threshold parameters so that the authentication process is better tailored to the specifics of the authentication request and the provision of a dynamic authentication engine that is configured to update the thresholds used as part of the authentication request over time, that either embodiment can be implemented independently of the other embodiment. In this way it will be appreciated by the person skilled in the art that the dynamic engine can be provided in an implementation where only one threshold parameters is provided and this one parameter is updated or in an implementation where multiple threshold parameters are provided and one or more of these parameters are updated.

The words comprises/comprising when used in this specification are to specify the presence of stated features, integers, steps or components but does not preclude the presence or addition of one or more other features, integers, steps, components or groups thereof.

The invention claimed is:

1. A biometric authentication system configured to enable an authentication process, the process having predefined parameters associated therewith, the process providing for authentication of a user based on a comparison of a presented biometric with at least one previously stored biometric, said authentication system comprising:
   a matching system providing as an output an output score based on the comparison of the presented biometric and the at least one previously stored biometric, said authentication system being configured to authenticate the user on determining that a parameter based on the output score, meets a threshold score; and
   an audit module configured to monitor the authentication process and to provide at least one revised threshold score, the at least one revised threshold score being provided based on an analysis of the performance of said authentication system over a predefined time period using current threshold scores.

2. The system as claimed in claim 1 further including interrogation means configured to interrogate the authentication process so as to extract and use the predefined parameters to select an appropriate threshold score from a plurality of available threshold scores, each of the plurality of available threshold scores being previously generated for specific parameters.

3. The system as claimed in claim 2 wherein the thresholds or parameters are selected based on an identity of the user being authenticated.

4. The system as claimed in claim 3 wherein said authentication system is configured to maintain historical data relating to each of a plurality of users, and wherein the authentication process is configured to select a first set of thresholds or parameters for a first user and a second set of thresholds or parameters for a second user, the first and second sets being generated through use of said authentication system by the first and second users.

5. The system as claimed in claim 2 wherein said interrogation means is further configured to determine parameters associated with enrollment of the user and to determine parameters associated with an authentication request, such that an enrollment threshold score is provided when determining parameters associated with enrollment and an authentication threshold score is provided when determining parameters associated with the authentication request, and wherein the appropriate threshold score is determined as a result of combining the enrollment and authentication threshold scores.

6. The system as claimed in claim 2 wherein said interrogation means is further configured to interrogate an authentication request so as to select a correct threshold score, the correct threshold score having been previously defined for specifics of enrollment and authentication request parameters for a user making the authentication request.

7. The system as claimed in claim 2 wherein said interrogation means is further configured to interrogate both an authentication request and an enrollment request so as to determine an appropriate policy for the authentication request, the appropriate policy defining a correct threshold score to be used as part of the authentication request.

8. The system as claimed in claim 1 wherein a meeting of the threshold score is determined if the parameter based on the output score is equal to the threshold score.

9. The system as claimed in claim 1 wherein a meeting of the threshold score is determined if the parameter based on the output score is less than the threshold score.

10. The system as claimed in claim 9 wherein the threshold score is a False Match Rate threshold score and the output score must be less than the threshold score to enable the user to be authenticated.

11. The system as claimed in claim 1 wherein a meeting of the threshold score is determined if the parameter based on the output score is greater than the threshold score.

12. The system as claimed in claim 1 wherein the parameter based on the output score is the output score.

13. The system as claimed in claim 1 wherein the parameter based on the output score is a transformed value of the output score.

14. The system as claimed in claim 1 wherein the predefined parameters are selected from a user population type, a user gender, a user age, a biometric sample type, a hardware type, an algorithm used in the matching process, an algorithm used in an enrollment process, a quality assessment algorithm used in an acquisition process, environmental factors, a user identity, and a user group.

15. The system as claimed in claim 1 wherein the authentication process is configured to authenticate the user on the basis of providing a threshold score that is a result of a combination of a plurality of threshold scores.

16. The system as claimed in claim 1 wherein the authentication process is configured to authenticate the user based on a score resulting from a combination of multiple output scores, or values transformed from the combination of multiple output scores, when compared against a single threshold score.

17. The system as claimed in claim 1 wherein the threshold score is at least one parameter resulting from analysis of biometric accuracy tables or statistics.

18. The system as claimed in claim 17 wherein the biometric accuracy tables or statistics are derived from one of individual receiver operator characteristic curve data, individual cumulative match characteristic data, individual false acceptance rate data, and individual score distribution data.

19. The system as claimed in claim 1 wherein the at least one revised threshold score is used to update the current threshold scores periodically so as to provide a tuning of said authentication system based on usage of said authentication system.

20. A distributed network of authentication systems, at least one of said authentication systems being configured to enable an authentication process, the process having predefined parameters associated therewith, the process providing for authentication of a user based on a comparison of a presented biometric with at least one previously stored biometric, said at least one authentication system comprising:

a matching system providing as an output an output score based on the comparison of the presented biometric and the at least one previously stored biometric, said at least one authentication system being configured to authenticate the user on determining that a parameter based on the output score, meets a threshold score; and an audit module configured to monitor the authentication process and to provide at least one revised threshold score, the at least one revised threshold score being provided based on an analysis of the performance of said at least one authentication system over a predefined time period using current threshold scores, wherein said network comprises at least one audit module configured to receive data relating to the authentication process from at least one of said authentication systems within said network, process the received data so as to provide an analysis of the performance of said at least one of said authentication systems using current threshold scores, and generate at least one revised threshold score to supplement the current threshold scores used at one or more of said authentication systems within said network.

21. The network as claimed in claim 20 wherein each of said authentication systems within said network includes an audit module.

22. The network as claimed in claim 21 wherein each of said audit modules is configured to communicate with others of said audit modules so as to enable a transfer of revised threshold scores between said authentication systems.

23. The network as claimed in claim 20 wherein said at least one audit module is provided distinct from any of said authentication systems, said at least one audit module being configured to communicate with at least one of said authentication systems so as to receive and transmit data relating to threshold scores used within individual ones of said authentication systems.

24. A method of authenticating a user based on a biometric sample presented by the user, said method comprising:

receiving a request for authentication, the request for authentication including a presented biometric;

analyzing specifics of the request so as to extract at least one parameter specific to the request;

matching the presented biometric with a previously stored biometric for the user so as to provide a matching score;

comparing a stored threshold score with the matching score;

authenticating the user on determining that the matching score exceeds the stored threshold score; and monitoring the performance of an authentication process over time and updating the stored threshold score with a revised threshold score on determining that the performance of the authentication process using the stored threshold score falls below a desired performance criteria, wherein said updating operation is performed using a computer.

25. The method as claimed in claim 24 wherein the authentication request is performed at a time of capturing the presented biometric.

26. The method as claimed in claim 24 wherein the authentication request is performed at a tune subsequent to capturing the presented biometric.

27. The method as claimed in claim 26 further comprising capturing the presented biometric at a first location and transporting the presented biometric to a second location for matching against an appropriate table.

28. The method as claimed in claim 27 wherein the appropriate table is generated from a specific population subset.

29. The method as claimed in claim 26 wherein the user is a non-cooperative user.

30. The method as claimed in claim 29 wherein the presented biometric is captured during surveillance activities without the user's knowledge.

31. The method as claimed in claim 24 wherein in response to the request for authentication a plurality of biometrics are received, the authentication of the user resulting from a matching of one or more of each of the plurality of biometrics.

32. The method as claimed in claim 31 wherein the user is authenticated irrespective of whether all presented biometrics match, the authentication being determined based on a confidence level associated with the plurality of presented biometrics being met.

33. The method as claimed in claim 24 further comprising monitoring the performance of the authentication process and generating at least one revised threshold score for use in future authentication processes based on historical authentication processes.

34. The method as claimed in claim 24 further comprising comparing the revised threshold score with the stored threshold score and triggering an alarm when a predetermined level of deviation between the revised threshold score and the stored threshold score is exceeded.

* * * * *